(12) United States Patent
Schroeck

(10) Patent No.: US 8,046,980 B1
(45) Date of Patent: Nov. 1, 2011

(54) WEED WHACKER ATTACHMENT

(76) Inventor: Elaine Schroeck, East Islip, NY (US)

(*) Notice: Subject to any disclaimer, the term of this patent is extended or adjusted under 35 U.S.C. 154(b) by 0 days.

(21) Appl. No.: 12/848,650

(22) Filed: Aug. 2, 2010

(51) Int. Cl.
*A01D 34/00* (2006.01)

(52) U.S. Cl. .................................................. 56/12.7

(58) Field of Classification Search ............ 56/12.7, 56/16.7, 17.2, 13.7, 13.5, 10.7
See application file for complete search history.

(56) References Cited

U.S. PATENT DOCUMENTS

| | | | | |
|---|---|---|---|---|
| 4,642,976 A * | 2/1987 | Owens | ............. | 56/16.9 |
| 4,718,221 A * | 1/1988 | Wessel et al. | ............. | 56/16.9 |
| 4,936,886 A * | 6/1990 | Quillen | ............. | 56/16.7 |
| D334,200 S * | 3/1993 | Clifton | ............. | D15/17 |
| D359,291 S * | 6/1995 | Tihonovich | ............. | D15/14 |
| 5,694,752 A * | 12/1997 | Warfield, III | ............. | 56/13.6 |
| 5,892,518 A * | 4/1999 | Mizobata et al. | ............. | 345/474 |
| 6,094,896 A * | 8/2000 | Lane | ............. | 56/13.7 |
| 6,343,461 B1 * | 2/2002 | Knott | ............. | 56/16.9 |
| 6,381,936 B1 * | 5/2002 | Lin | ............. | 56/16.7 |
| 6,397,572 B1 * | 6/2002 | Roundy et al. | ............. | 56/13.7 |
| 6,430,906 B1 * | 8/2002 | Eddy | ............. | 56/13.7 |
| 6,892,518 B1 | 5/2005 | Bares | | |
| 6,966,168 B1 * | 11/2005 | Kerr, Sr. | ............. | 56/12.7 |
| 6,986,238 B1 * | 1/2006 | Bloodworth | ............. | 56/12.7 |
| 7,028,455 B1 * | 4/2006 | Liguras | ............. | 56/13.6 |
| 7,107,745 B2 * | 9/2006 | Dunda | ............. | 56/12.7 |
| 7,111,404 B2 * | 9/2006 | Hanes et al. | ............. | 30/276 |
| 7,219,488 B2 * | 5/2007 | Hatfield | ............. | 56/13.6 |
| 7,644,565 B2 * | 1/2010 | Uihlein | ............. | 56/13.7 |
| D616,904 S * | 6/2010 | Armstrong | ............. | D15/17 |

* cited by examiner

*Primary Examiner* — Arpad Fabian-Kovacs
(74) *Attorney, Agent, or Firm* — Kyle Fletcher

(57) ABSTRACT

The weed whacker attachment includes a weed whacker that extends via an arm from a mounting means that attaches upon the deck of a lawnmower. A pivoting motor rests atop the mounting means and rotates the arm around the deck of the lawn mower, which moves the weed whacker around to different sides of the lawnmower. An optional switch enables an end user to control both the weed whacker and the pivoting motor from behind the push bar of the lawnmower.

15 Claims, 5 Drawing Sheets

WEED WHACKER ATTACHMENT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of weed whackers, more specifically, a weed whacker that attaches upon a deck of a lawnmower.

B. Discussion of the Prior Art

As will be discussed immediately below, no prior art discloses a weed whacker attachment that mounts upon a top surface of a lawnmower deck via mounting means and wherein the device can detach from the lawnmower deck, wherein an arm extends from the attaching means to a pre-selected height and distance away from the deck of the lawnmower wherein a weed whacker can cut through grass and like vegetation, wherein a pivoting motor is mounted atop said mounting means to enable the arm to rotate around the deck of the lawnmower in order to make the weed whacker more accessible from different sides of the lawnmower operates both the weed whacker and the pivoting motor.

The Hatfield patent (U.S. Pat. No. 7,219,488) discloses a mounting apparatus that attaches a string trimmer to a lawn mower. However, the apparatus is suited for use with a riding lawnmower and not a push mower.

The Owens patent (U.S. Pat. No. 4,642,976) discloses a lawn mower trimmer and edger attachment permitting easy adjustment of the height of the trimmer head above the ground, its horizontal angle with respect to the frame of the mower, and the inclination of the head from a horizontal to a vertical orientation or any angle of inclination there between, and is operated by an electric motor. However, the attachment is suited for use with riding mowers and vehicles, and does not include a pivoting motor that can adjust the location of the weed whacker with respect to the vehicle or riding lawnmower.

The Knott patent (U.S. Pat. No. 6,343,461) discloses a telescopingly adjustable lawn trimmer attachment apparatus for riding lawn mowers. However, the attachment is permanently attached to a side of a riding lawn mower, and is not suited for use with a deck of a push lawnmower.

The Wessel et al. patent (U.S. Pat. No. 4,718,221) discloses a rotary lawnmower having an edger and trimmer capable of being placed in a retracted and stowed position. However, the edger and trimmer is not capable of trimming at a horizontal inclination grass or like vegetation, and also the trimmer is not detachable from the lawnmower.

The Bares patent (U.S. Pat. No. 6,892,518) discloses a trimmer assembly for a lawn mower is detachaby mountable on a deck of the lawn mower by a housing or shroud that can be secured to the front edge of the deck. However, the trimmer assembly is integrated into an existing mowing deck by the inclusion of an elongated drive belt or an additional drive belt and is not an apparatus that can temporarily be attached to a top surface of a lawnmower deck and of which can perform weed whacking functions.

The Clifton patent (U.S. Pat. No. Des. 334,200) illustrates a design of a lawn trimmer attachment for a riding lawn mower, which does not attach onto a lawnmower deck and include a pivoting motor.

The Eddy patent (U.S. Pat. No. 6,430,906) discloses a mower attachment that is used for trimming with spinning lines. However, the attachment does not include an arm attached to a pivoting motor that can rotate said arm to adjust the location of the weed whacker with respect to a deck of a push behind style lawnmower.

The Roundy et al. patent (U.S. Pat. No. 6,397,572) discloses a lawnmower mountable trimming device including a mounting bracket adapted for coupling with the deck of a lawnmower. However, the mounting bracket does not use a pivoting motor and arm to adjust the location of the weed whacker mounted upon said arm, and more importantly the mounting bracket does not feature attaching means that enables the attachment to easily detach from a top surface of a deck of a push behind styled lawnmower.

The Lane patent (U.S. Pat. No. 6,094,896) discloses a lawnmower lawn trimmer assembly for allowing a user to easily trim weeds and grass while using a lawn mower. However, the assembly does not include an arm and pivoting motor to rotate the weed whacker with respect to the lawnmower.

The Tihonovich patent (U.S. Pat. No. Des. 359,291) illustrates an ornamental design for a mower with a line trimmer attachment, which does not depict a detachable assembly.

While the above-described devices fulfill their respective and particular objects and requirements, they do not describe a weed whacker attachment that mounts upon a top surface of a lawnmower deck via mounting means and wherein the device can detach from the lawnmower deck, wherein an arm extends from the attaching means to a pre-selected height and distance away from the deck of the lawnmower wherein a weed whacker can cut through grass and like vegetation, wherein a pivoting motor is mounted atop said mounting means to enable the arm to rotate around the deck of the lawnmower in order to make the weed whacker more accessible from different sides of the lawnmower, and wherein a switch mounted on the push bar of the lawnmower operates both the weed whacker and the pivoting motor. In this regard, the weed whacker attachment departs from the conventional concepts and designs of the prior art.

SUMMARY OF THE INVENTION

The weed whacker attachment includes a weed whacker that extends via an arm from a mounting means that attaches upon the deck of a lawnmower. A pivoting motor rests atop the mounting means and rotates the arm around the deck of the lawn mower, which moves the weed whacker around to different sides of the lawnmower. An optional switch enables an end user to control both the weed whacker and the pivoting motor from behind the push bar of the lawnmower.

It is an object of the invention to provide a weed whacker that mounts onto the deck of a lawnmower and of which can cut grass and like sized vegetation adjacent said lawnmower.

A further object of the invention is to provide an arm that extends the weed whacker out a predefined distance and height from the mounting means.

A further object of the invention is to provide a pivoting motor that enables adjustment of the location of the weed whacker with respect to the deck of the lawnmower.

A further object of the invention is to provide a switch that can operate the weed whacker and pivoting motor from behind the push bar of the lawnmower.

A further object of the invention is to provide a weed whacker that is powered by at least one rechargeable battery, and wherein a jack is provided to recharge said battery.

These together with additional objects, features and advantages of the weed whacker attachment will be readily apparent to those of ordinary skill in the art upon reading the following detailed description of presently preferred, but nonetheless illustrative, embodiments of the weed whacker attachment when taken in conjunction with the accompanying drawings.

In this respect, before explaining the current embodiments of the weed whacker attachment in detail, it is to be understood that the weed whacker attachment is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the weed whacker attachment.

It is therefore important that the claims be regarded as including such equivalent construction insofar as they do not depart from the spirit and scope of the weed whacker attachment. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 5 illustrates an isometric view of the weed whacker attachment in use with a deck of a lawnmower and featuring an optional power switch that is located on the push bar of the lawnmower and of which operates the weed whacker there from.

DETAILED DESCRIPTION OF THE EMBODIMENT

Figure 1:
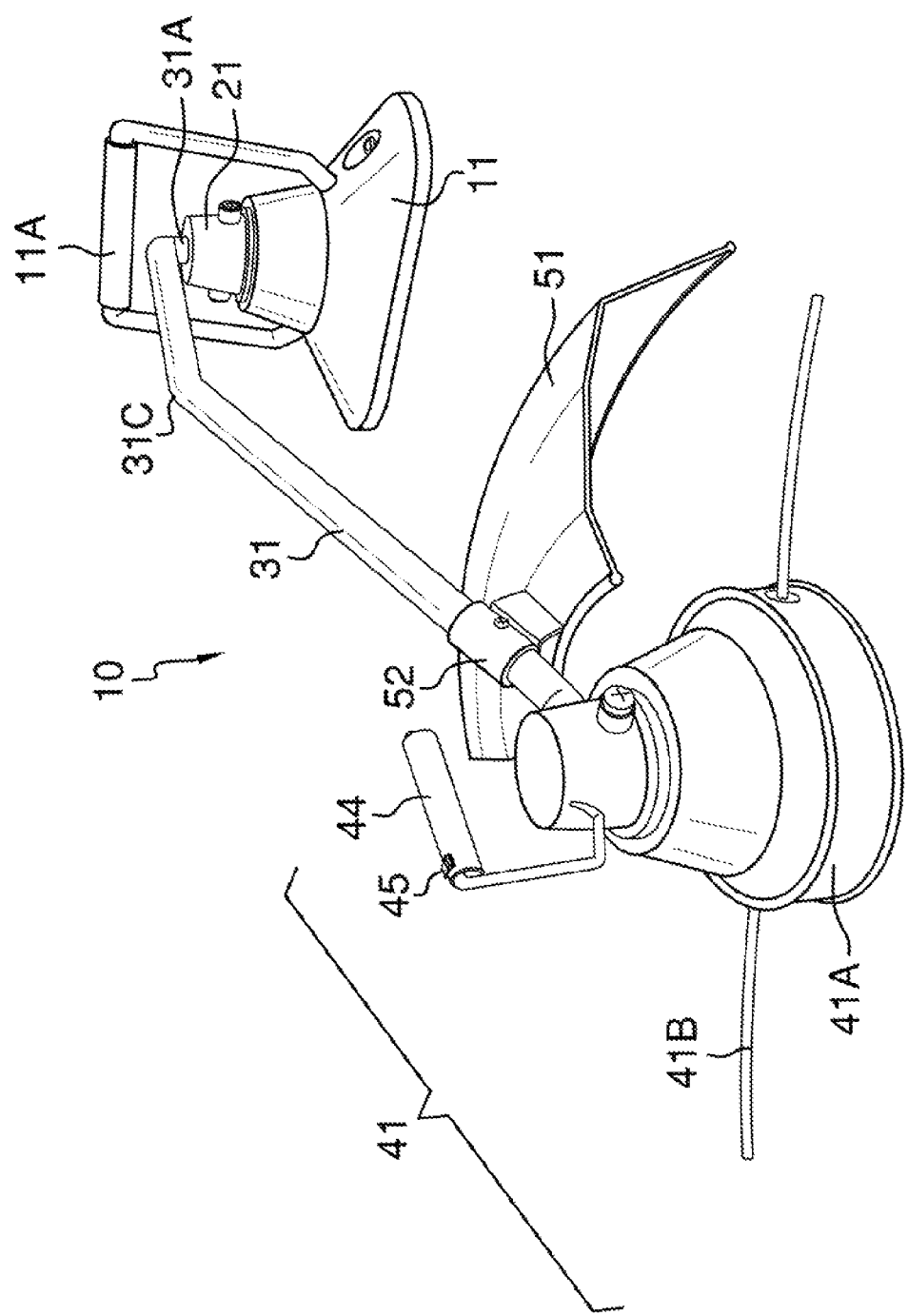
FIG. 1 illustrates a front, isometric view of the weed whacker attachment by itself.
Figure 2:
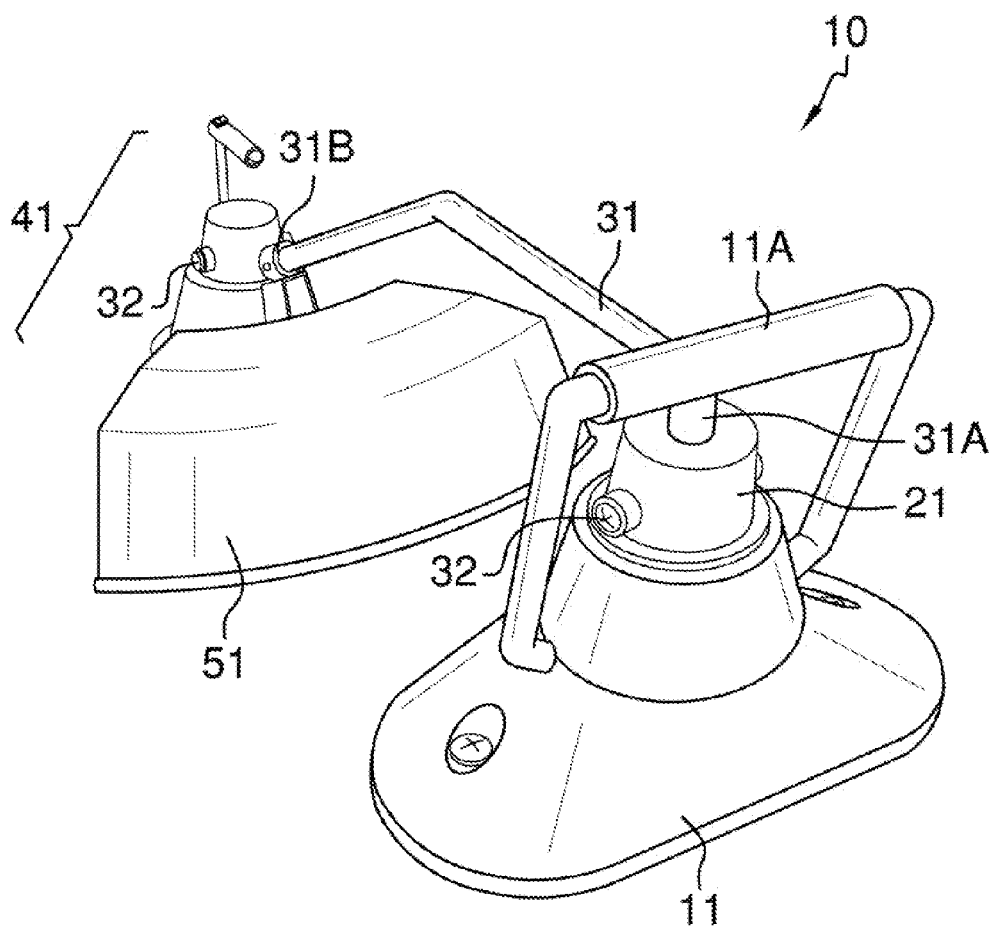
FIG. 2 illustrates a rear, isometric view of the weed whacker attachment.
Figure 3:
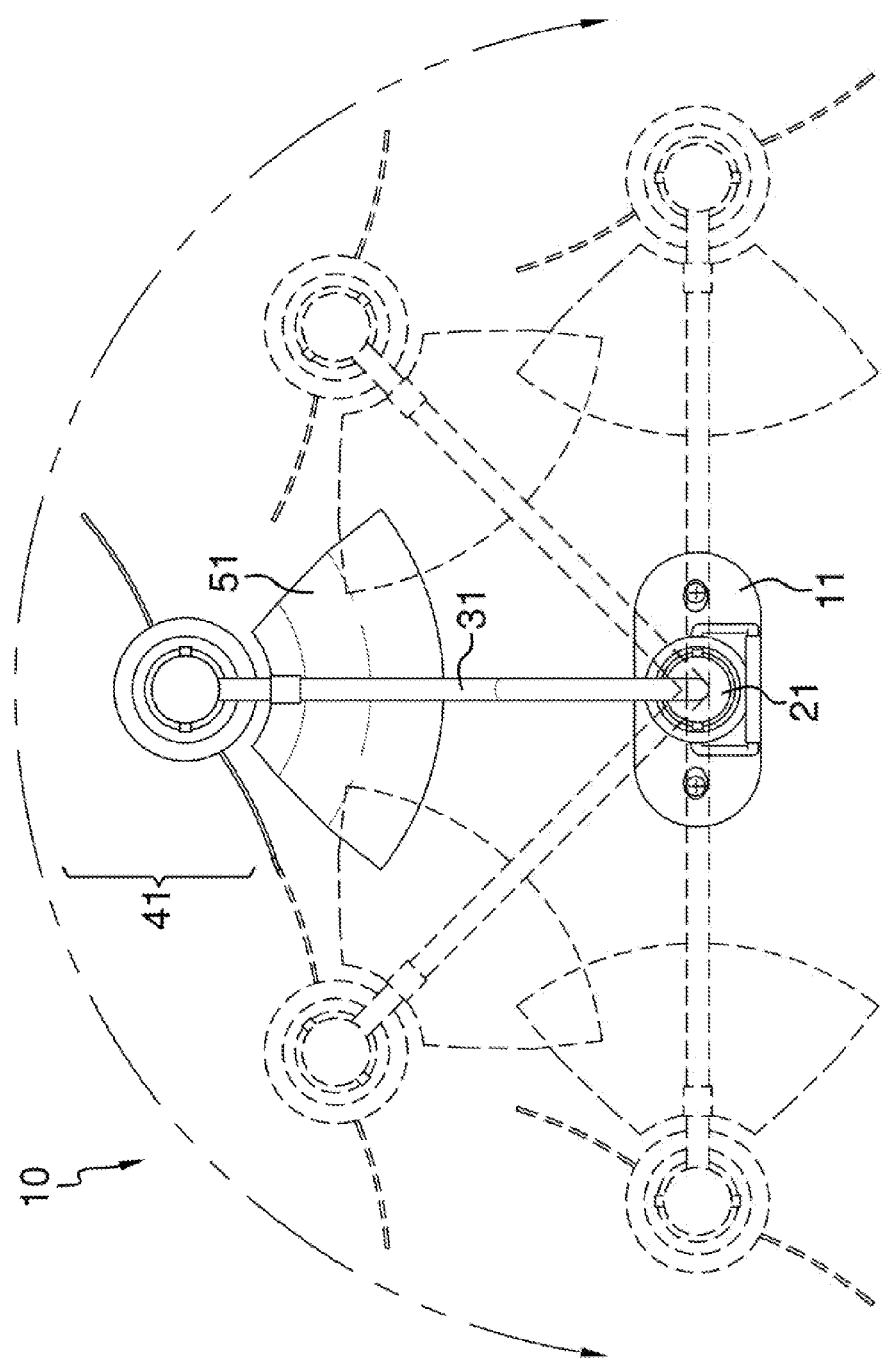
FIG. 3 illustrates a top view of the weed whacker attachment and detailing rotational movement of the pivoting motor to illustrate how the attachment can rotate with respect to the suction attachment to move the weed whacker with respect to the lawnmower deck.
Figure 4:
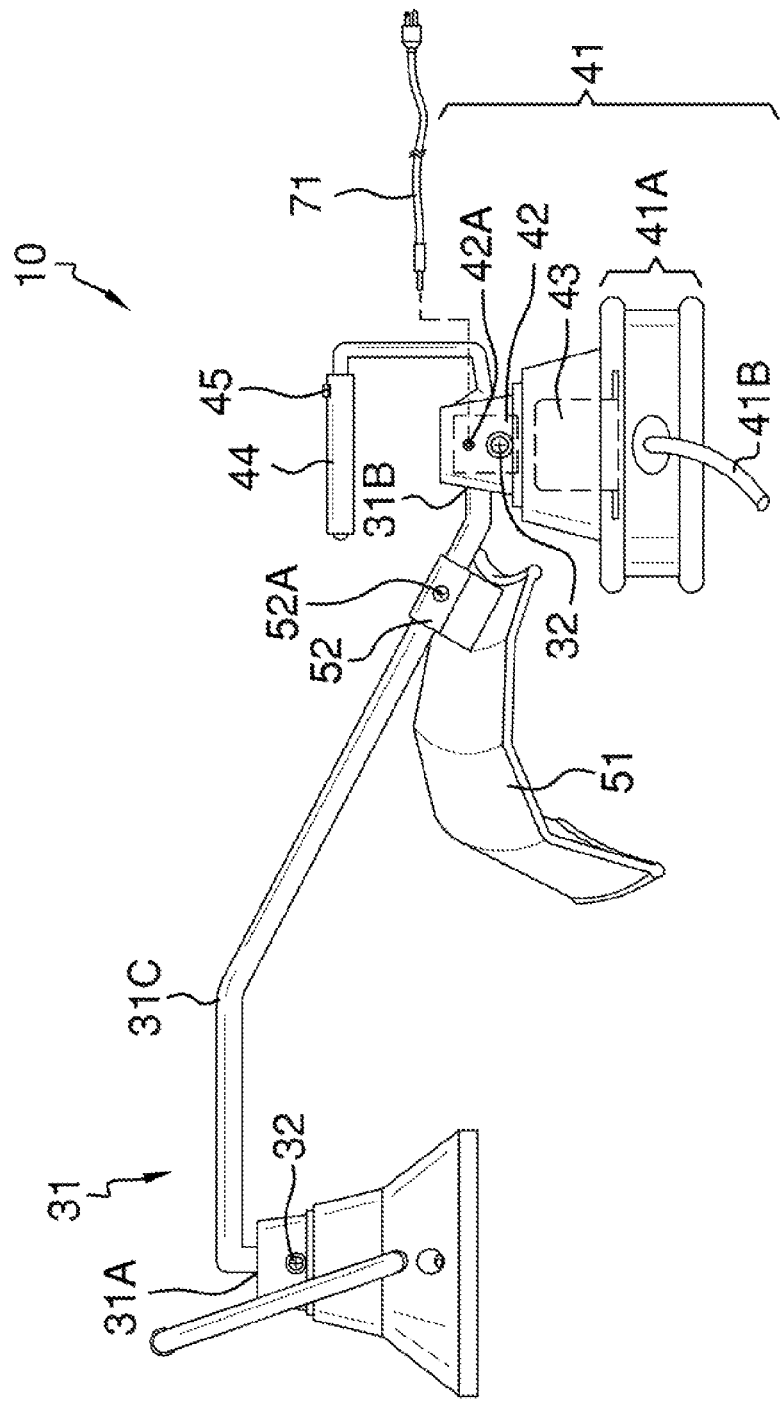
FIG. 4 illustrates a side view of the weed whacker attachment and depicting the motor and battery in dashed lines.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A weed whacker attachment 10 (hereinafter invention) includes a mounting means 11, a pivoting motor 21, an arm 31, a weed whacker 41, and a shield 51.

The mounting means 11 enables the invention 10 to be attached to a top surface of a deck 91 of a lawnmower 90. The mounting means 11 also enables the invention 10 to be detached from the lawnmower 90 as needed. The mounting means 11 comprises at least one suction cup that is well known in the art and relies upon the creation of a vacuum to create a holding force.

The mounting means 11 also includes a handle 11A that aids in the removal of the mounting means 11 from the deck 91 of the lawnmower 90. The handle 11A also acts as a stop to the rotational movement of the arm 31 to be discussed below.

The pivoting motor 21 is mounted atop the mounting means 11. The pivoting motor 21 is attached to a first end 31A of the arm 31, and is secured thereon via a setscrew 32. The pivoting motor 21 can rotate the arm 31 with respect to both the mounting means 11 and the deck 91 of the lawnmower 90. It is being asserted that the pivoting means 21 is a novel and nonobvious feature of the invention 10 in that the pivoting means 21 enables the weed whacker 41 to rotate around the deck 91 of the lawnmower 90 as needed when in use (see FIGS. 3 and 5). As previously mentioned above, the handle 11A acts as a stop to prevent over-rotation of the arm 31 with respect to the mounting means 11. The handle 11A restrains the rotational movement of the pivoting motor 21 to 180 degrees of rotational movement (see FIG. 3).

The arm 31 attaches to the weed whacker 41 at a second end 31B via a setscrew 32. The arm 31 is of a defined length such that when the pivoting motor 21 rotates the arm 31, a general radius is formed of which the weed whacker 41 rotates thereon (see FIG. 3). The arm 31 also includes a bend 31C, which adjusts the height of the weed whacker 41 with respect to the mounting means 11 and the deck 91.

The weed whacker 41 includes a powering means 42, a motor 43, a handle 44, power switch 45, and weed whacker 41A through which a line 41B extends to provide shearing action. The handle 43 is included to enable manual movement of the weed whacker 41 with respect to the mounting means 11. The handle 43 also provides a location with which to place the power switch 45, which operates the motor 43. The powering means 42 consists of at least one rechargeable battery that powers the motor 43. A power jack 42A enables a cord 71 to deliver electricity for recharging the powering means 42.

The shield 51 attaches onto the arm 31 via bracket 52. The bracket 52 is adjustable in that a setscrew 52A is provided to lock the bracket 52 onto a particular location upon the arm 31. The bracket 52 is simply a piece of tubular construction that slides over the arm 31 and can slide up and down the arm 31 to the desired location thereon.

Figure 5:
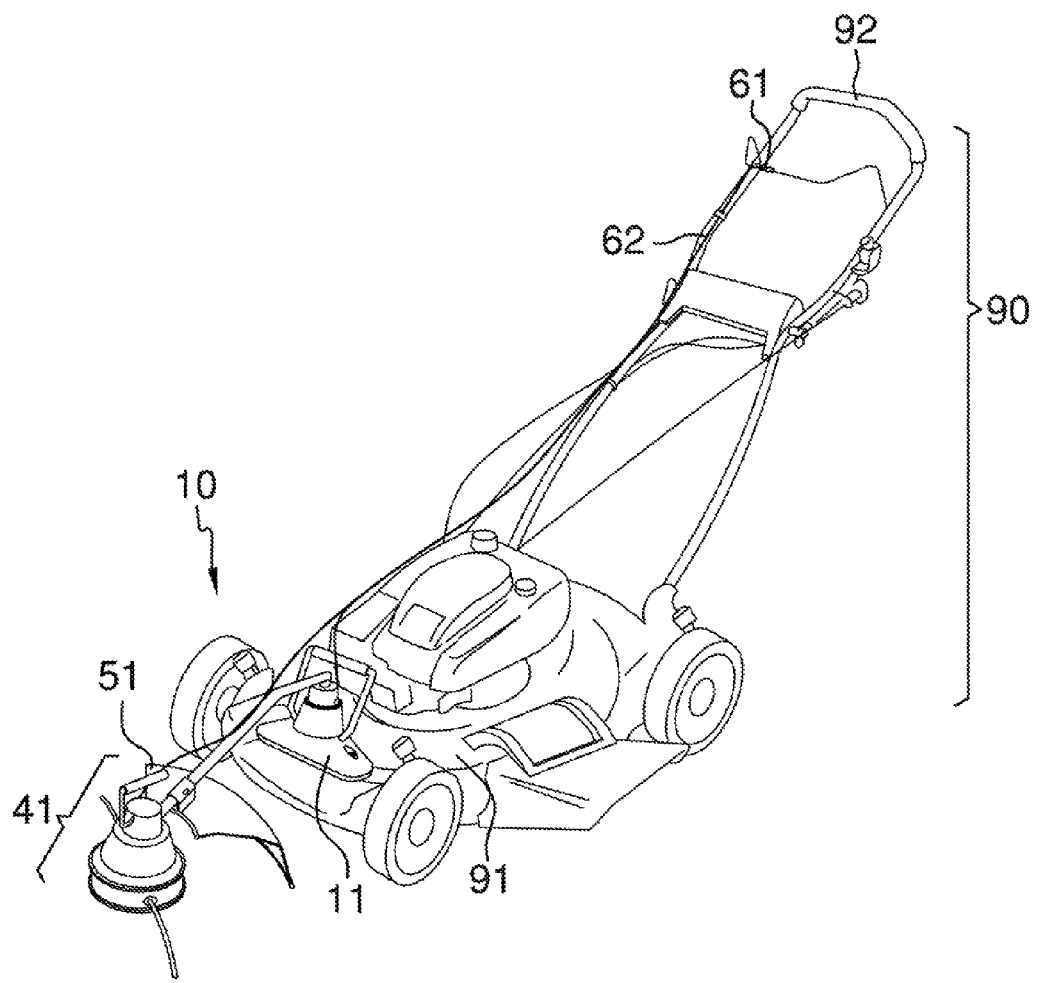

Referring to FIG. 5, the invention 10 includes a switch 61 that is attached onto a push bar 92. The switch 61 is attached to at least one line 62 that runs down to connect to the invention 10. In particular, the line(s) 62 may be wired to the motor 43 of the weed whacker 41 and/or the pivoting motor 21. The switch 61 enables an end user to operate either or both the weed whacker 41 and pivoting motor 21 from behind the push bar 92 of the lawnmower 90 such that said end user can be walking behind the lawnmower 90 as the lawnmower 90 is being used, and simultaneously control and operate use of the invention 10.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A weed whacker attachment for use with a lawnmower, comprising:
    a mounting means that attaches onto a top surface of a lawnmower deck and upon which a pivoting motor rotates from a first end of an arm;
    wherein a weed whacker is mounted on a second end of said arm;
    wherein the pivoting motor enables the weed whacker to rotate about the mounting means and location upon the deck of the lawnmower, and which enables access of said weed whacker by manual movement to different sides with respect to the deck of the lawnmower;
    wherein the arm extends from the mounting means to a pre-selected height and distance away from the deck of the lawnmower and from which said weed whacker can cut through grass vegetation;
    wherein a shield attaches upon the arm via a bracket;
    wherein the bracket of the shield is secured onto the arm via a plurality of setscrews;
    wherein a switch attaches itself upon a push bar of said lawnmower and is wiredly attached to a line that runs down to either the pivoting motor or the weed whacker.

2. The weed whacker attachment as described in claim 1 wherein the weed whacker further comprises a motor, powering means, handle, power button, and said line; wherein the handle provides manual movement of the weed whacker with respect to the mounting means.

3. The weed whacker attachment as described in claim 2 wherein the powering means consists of at least one rechargeable battery.

4. The weed whacker attachment as described in claim 3 wherein a power jack is included and of which enables an electrical cord to transmit electricity to the powering means in order to recharge the powering means.

5. The weed whacker attachment as described in claim 1 wherein the mounting means further comprises at least one suction cup that secures the attachment onto the deck of the lawnmower.

6. The weed whacker attachment as described in claim 5 wherein the mounting means includes a handle that is used to detach the mounting means from the deck of the lawnmower; and wherein the handle also acts as a stop to limit the rotational movement of the pivoting motor.

7. The weed whacker attachment as described in claim 1 wherein the arm is secured to both the pivoting motor and the weed whacker via said setscrews.

8. The weed whacker attachment as described in claim 1 wherein the arm features a bend that adjusts the height of the weed whacker with respect to the mounting means.

9. A weed whacker attachment for use with a lawnmower, comprising:
    a mounting means that attaches onto a top surface of a lawnmower deck and upon which a pivoting motor rotates from a first end of an arm;
    wherein a weed whacker is mounted on a second end of said arm;
    wherein a shield attaches upon the arm via a bracket, and wherein the bracket of the shield is secured onto the arm via a plurality of setscrews
    wherein the pivoting motor enables the weed whacker to rotate about the mounting means and location upon the deck of the lawnmower, and which enables access of said weed whacker by manual movement to different sides with respect to the deck of the lawnmower;
    wherein the arm extends from the mounting means to a pre-selected height and distance away from the deck of the lawnmower and from which said weed whacker can cut through grass vegetation;
    wherein a handle located on the mounting means limits the rotational movement of the pivoting motor; and wherein said handle aids in detachment of the mounting means from the deck of said lawnmower;
    wherein the weed whacker further comprises a motor, powering means, handle, power button, and a line; wherein the handle provides manual movement of the weed whacker with respect to the mounting means;
    wherein a switch attaches itself upon a push bar of said lawnmower and is wiredly attached to said line that runs down to either the pivoting motor or the weed whacker.

10. The weed whacker attachment as described in claim 9 wherein the powering means consists of at least one rechargeable battery.

11. The weed whacker attachment as described in claim 10 wherein a power jack is included and of which enables an electrical cord to transmit electricity to the powering means in order to recharge the powering means.

12. The weed whacker attachment as described in claim 9 wherein the mounting means further comprises at least one suction cup that secures the attachment onto the deck of the lawnmower.

13. The weed whacker attachment as described in claim 9 wherein the handle limits the rotational movement of the pivoting motor to 180 degrees or less.

14. The weed whacker attachment as described in claim 9 wherein the arm is secured to both the pivoting motor and the weed whacker via said setscrews.

15. The weed whacker attachment as described in claim 9 wherein the arm features a bend that adjusts the height of the weed whacker with respect to the mounting means.

* * * * *